United States Patent [19]

Arai

[11] Patent Number: 5,375,213
[45] Date of Patent: Dec. 20, 1994

[54] ADDRESS TRANSLATION DEVICE AND METHOD FOR MANAGING ADDRESS INFORMATION USING THE DEVICE

[75] Inventor: Toshiaki Arai, Sagamihara, Japan

[73] Assignee: Hitachi, Ltd., Tokyo, Japan

[21] Appl. No.: 574,063

[22] Filed: Aug. 29, 1990

[30] Foreign Application Priority Data

Aug. 29, 1989 [JP] Japan .................. 1-220389

[51] Int. Cl.⁵ .............................. G06F 12/10
[52] U.S. Cl. ................. 395/400; 395/425; 364/DIG. 1; 364/255.1; 364/255.5; 364/256.3; 364/933.5
[58] Field of Search ............. 364/200 MS, 900 MS; 395/400, 425

[56] References Cited

U.S. PATENT DOCUMENTS

| | | | |
|---|---|---|---|
| 4,347,565 | 8/1982 | Kaneda et al. | 395/400 |
| 4,349,873 | 9/1982 | Gunter et al. | 364/200 |
| 4,521,846 | 6/1985 | Scalzi et al. | 395/425 |
| 4,792,897 | 12/1988 | Gotou et al. | 395/400 |
| 4,814,975 | 3/1989 | Hirosawa et al. | 395/375 |
| 4,943,913 | 7/1990 | Clark | 395/700 |
| 4,970,641 | 11/1990 | Hester et al. | 395/408 |
| 4,991,083 | 2/1991 | Aoyama et al. | 395/800 |
| 4,992,936 | 2/1991 | Katada et al. | 395/400 |
| 5,109,489 | 4/1992 | Umeno et al. | 395/275 |
| 5,168,557 | 12/1992 | Shibuya | 395/375 |
| 5,201,052 | 4/1993 | Oshima | 395/725 |
| 5,220,669 | 6/1993 | Baum et al. | 395/775 |

*Primary Examiner*—Joseph L. Dixon
*Assistant Examiner*—Frank J. Asta
*Attorney, Agent, or Firm*—Antonelli, Terry, Stout & Kraus

[57] ABSTRACT

An address translation device for translating a virtual address belonging to each one of a plurality of virtual spaces into a real address, comprises: a first circuit for holding a plurality of virtual space identifiers indicating the corresponding virtual spaces; a second circuit for holding first selecting information specifying a virtual space identifier for a virtual space to which a virtual address for an instruction belongs from among the plurality of virtual space identifiers held in the first means, and second selecting information specifying a virtual space identifier for a virtual space to which a virtual address for an operand belongs; a third circuit for selecting any one of the virtual space identifiers specified by the first selecting information and the second selecting information held in the second means, depending on whether the virtual address to be translated is for the instruction or the operand; and a fourth circuit for translating the virtual address into a corresponding real address depending on the selected virtual space identifier.

11 Claims, 15 Drawing Sheets

INITIALIZING OF ADDRESS TRANSLATION EXCEPTION NEW PSW

INITIALIZING OF ADDRESS TRANSLATION
EXCEPTION NEW PSW

ADDRESS TRANSLATION EXCEPTION PROCESSING

FIG. 16

|  |  | OPERAND FETCH | | | |
|---|---|---|---|---|---|
|  |  | P SPACE | S SPACE | H SPACE | AR SPECIFYING SPACE |
| INSTRUCTION FETCH | P SPACE | YES (0 0) | YES (1 0) | NO | YES (0 1) |
|  | S SPACE | NO | NO | NO | NO |
|  | H SPACE | NO | NO | YES (1 1) | NO |

NOTE: DIGITS IN PARENTHESIS INDICATE A FLAG PATTERN IN A PROGRAM STATUS WORD.

FIG. 17

|  |  | OPERAND FETCH | | | |
|---|---|---|---|---|---|
|  |  | P SPACE | S SPACE | H SPACE | AR SPECIFYING SPACE |
| INSTRUCTION FETCH | P SPACE | YES (1 0 0 0 1 0 0) | YES (1 0 0 0 0 1 0) | YES (1 0 0 0 0 0 1) | YES (1 0 0 1 0 0 0) |
|  | S SPACE | YES (0 1 0 0 1 0 0) | YES (0 1 0 0 0 1 0) | YES (0 1 0 0 0 0 1) | YES (0 1 0 1 0 0 0) |
|  | H SPACE | YES (0 0 1 0 1 0 0) | YES (0 0 1 0 0 1 0) | YES (0 0 1 0 0 0 1) | YES (0 0 1 1 0 0 0) |

NOTE: DIGITS IN PARENTHESIS INDICATE A FLAG PATTERN IN A PROGRAM STATUS WORD.

ADDRESS TRANSLATION DEVICE AND METHOD FOR MANAGING ADDRESS INFORMATION USING THE DEVICE

BACKGROUND OF THE INVENTION

The present invention relates to an address translation device for a computer system employing a multiple virtual storage method and a method for managing address information when an interrupt is brought about during the address translation performed by the device.

The multiple virtual storage method is designed to manage virtual spaces using the address translation device and a plurality of address translation tables. The method is a well-known technique used in the current mainframe. The address translation device is designed to load instructions and data on a virtual space and translate an address on the virtual space referred to as a virtual address into a real address. The method takes the step of reading data or executing instructions based on the real addresses given by the device. An operating system (OS) is provided to prepare one address translation table for one virtual space used by the address translation device and switch the address translation table for managing a plurality of virtual spaces.

The address translation method and the managing method for virtual storage are well-known techniques in a field of a mainframe. These methods are detailed in "Virtual Memory System": Hirofumi Yosizawa, "Practical Use of Operating System", Shoukoudou, Ltd., (ISBN 4-7856-3503-7), Chapter 3, pp. 85 to 124 and "Memory Management": S. E. Madnick, J. J. Donovan, "Operating Systems" McGRAW-HILL KOGAKU-SYA, LTD., 07-85467-X, Chapter 3, pp. 105 to 208.

The operating system employing the multiple virtual storage method is capable of creating a plurality of virtual spaces. That is, by allocating respective virtual spaces to the users, they can use their respective allocated virtual spaces. This operating system, however, has a shortcoming that the virtual area referred by each user is limited. That is because, in actuality, each user can refer to only one virtual space and the total capacity for each user is limited by an address width specified by an instruction operand. For example, if the address width is 31 bits, the capacity is limited as 2GB ($2^{31}$B).

In order to overcome the shortcoming, an address translation device is designed to provide a space selector device for determining which virtual space an operand is to be picked up. It is disclosed in JP-A-56-140576 and 57-143783. The devices disclosed in both publications are designed to enter a base register number into a space selector device and selecting the virtual space according to the base register number. The design makes it possible to access any virtual space even if it does not contain an instruction. It results in being able to access a large capacity of virtual storage as if an address width would be substantially expanded. Concretely, these devices are designed to match a register referred to as an access register to each general-purpose register so that the access register can directly or indirectly point to a segment table. When calculating an instruction operand address, the address translation is carried out using the segment table pointed by the access register. As stated above, the access register is related to the general-purpose register specified as a base register.

This method makes it possible for a user to refer to a plurality of virtual spaces based on one virtual space by using a plurality of access registers. The difference between the inventions disclosed in JP-A-56-140576 and JP-A-57-143783 is that the former invention is designed to allow the access register to directly point to the segment table register, while the latter invention is designed to allow the access register to point to the origin register of the segment table. The difference is essentially negligible.

The address translation device described in the foregoing Laid-Open publication makes it possible for a user to refer to a plurality of virtual spaces based on one address space, thereby realizing substantial address expansion.

The address translation device disclosed in the foregoing Laid-Open publication has an object of assuming a plurality of virtual spaces for data to be accessed. On the other hand, a method is designed to locate instructions on a plurality of virtual spaces. The system is detailed, for example, in IBM manual, IBM Enterprise Systems Architecture/370, Principles of Operation, SA22-7200-0, pp. 3-1 to 3-39. Herein, a plurality of control registers have respective virtual space identifiers. And, in a special control register PSW (Program Status Word) representing the status of a processor, a flag is provided for indicating which control register is effective. Then, an instruction is read from the virtual space indicated by the control register for the specified flag and is executed. Hence, by changing the contents of the plurality of control registers and the flag contained in the PSW, it is possible to execute the instruction located on any virtual space.

The computer system employing the foregoing hardware architecture is, for example, MVS/ESA manufactured by IBM. The system prepares three spaces (primary, secondary, home) for each user for the purpose of executing the process. The home space includes basic table and program groups for managing each user. The primary and secondary spaces are designed to be freely set by each user. As such, each user can execute a program (instruction) in more than one program as well as access more than one virtual space using an access register.

As is understood from the above description, the MVS/ESA system is capable of locating an instruction on more than one virtual space and data on the other virtual spaces, thereby implementing the use of the virtual storage having a far larger capacity than the conventional 2GB capacity. The summary of the MVS/ESA system is disclosed in IBM Systems Journal, vol. 28, no. 1, pp. 15 to 61.

However, the foregoing Patent Laid-open publication, Manual and Publication disclosing the address translation methods have mentioned no functions entailed when the address translation mechanism is built in the computer system. In particular, they have mentioned no concrete mechanism or method for performing interrupt processing when a user refers to a virtual space using an access register and for managing the virtual storage and real storage based on the OS.

In general, if something disadvantageous such as an address translation exception occurs when a user program is executed, an interrupt is caused, resulting in the OS starting the interrupt processing. The architecture used in the IBM 370 series, for example, is designed to save the program status word (PSW) used when interrupt is caused in a specific address of the main storage (interrupt new PSW) and replace the PSW with the interrupt new PSW when the interrupt is caused. The interrupt new PSW can be set for each interrupt kind. Hence, by writing a program address of the OS processing interrupt to a new PSW according to each interrupt kind, it is possible to pass control to the corresponding interrupt-processing program when the interrupt is caused.

However, the information specified to the interrupt new PSW merely includes an address of an instruction to be executed when an interrupt occurs and a specification flag of a virtual space to which the instruction is read. The other control registers and access registers used when the interrupt occurs remain unchanged. It means that an instruction address can be directed, while an operand address cannot be directed.

As such, the following disadvantages are brought about when the address translation method is built in the computer system.

(1) The area used in the interrupt processing is limited.

If an interrupt occurs when a user refers to a virtual space using an access register, the OS starts to search for the cause of an interrupt for determining which kind of interrupt it is. Since the interrupt occurs at any time, it is impossible to specify a value of an access register at the time. Hence, if the interrupt-processing program tries to execute an instruction, the used access register is the register matching to the base register specified by the instruction and the used operand is a space indicated by the access register. Since the value of the matched access register cannot be specified, it is impossible to define which virtual space the operand for the instruction is to be read. It results in the interrupt-processing program being unable to execute the object processing. In order to avoid this disadvantage, the interrupt-processing program has to execute the processing using only the instruction which does not use the base register. Yet, the area to be accessed without the base register is 4096 bytes (area specified by a displacement portion of 12 bits included in an operand). The area capacity is insufficient for the interrupt processing.

(2) A lot of overheads are required for solving an address translation exception When an address translation exception (page fault) interrupt occurs, it is necessary to allocate a real page to a virtual address at which a page fault occurs for completing address translation. When the page fault occurs in the virtual space related to the access register, it is necessary to obtain information used for identifying the virtual space, an identifier of an address space related to the access register, an address translation table address for the address space, a page register number on which the access register is related, and the like. With these pieces of information, the OS obtains an entry address for an address translation table matched to the virtual address at which a page fault occurs. The conventional hardware, however, merely saves the virtual address at which the page fault occurs at a specific address of the main storage. In order to obtain the foregoing pieces of information in accordance with the prior art, it is necessary to simulate address-calculating and address-translating process of an instruction which causes the page fault in accordance with the software and obtain a virtual address and a virtual space at which the page fault occurs. It results in entailing a lot of overhead.

SUMMARY OF THE INVENTION

It is therefore an object of the present invention to provide a method for freely using instructions and data loaded on a plurality of virtual spaces from a program.

It is a further object of the invention to provide an address translation device which is capable of mitigating the limitations of an area to be used when processing an interrupt.

It is another object of the invention to provide a method for managing address information which is capable of processing an address translation exception with less overhead than in conventional methods.

In order to achieve the foregoing objects, according to a first aspect of the present invention, an address translation device is provided for translating a virtual address belonging to any one of virtual spaces into a corresponding real address, and comprises: first means for holding a plurality of virtual space identifiers for respectively identifying the virtual spaces; second means for holding first selecting information specifying a virtual space identifier for a virtual space to which a virtual address for an instruction belongs among the plurality of virtual space identifiers held in the first means, and also for holding second selecting information specifying a virtual space identifier for a virtual space to which a virtual address for an operand belongs; third means for selecting any one of the virtual space identifiers specified by the first selecting information and the second selecting information held in the second means, depending on whether the virtual address to be translated is for the instruction or the operand; and fourth means for translating the virtual address into a corresponding real address.

According to a second aspect of the invention, an address translation device including a plurality of access registers, each having a virtual space identifier provided to match to each base register to be accessed by an instruction and the access register matched to the base register specified by the instruction and being designed to translate a virtual address into a corresponding real address using an address translation table specified by the pointed virtual space identifier, comprises means for cancelling the address translation when the address translation table is invalid and loading at least one of first, second and third informations to a main storage, said first information containing a number of a page register specified by the instruction, a content of an access register matching to the specified page register and at least one portion of the address translation table, said second information containing real addresses in invalid entries of the address translation table, and said third information containing a virtual address for an invalid entry of the address translation table, an access register for translating the virtual address and at least one portion of a page register related to the access register.

The present invention offers the following advantages.

(1) The second means is capable of independently holding first selecting information specifying a virtual space identifier for a virtual space to which a virtual address for an instruction belongs and second selecting information specifying a virtual space identifier for a virtual space to which a virtual address for an operand belongs. The use of an instruction on any virtual space, therefore, makes it possible to access data loaded on another virtual space.

(2) It has been conventionally necessary to update the content of the address translation table which is a cause of address translation when an address translation exception occurs. On the other hand, the present invention is designed to load at least one of first, second and third information to a main storage, said first information containing a number of a page register specified by the instruction, a content of an access register matching to the specified page register and at least one portion of the address translation table, said second information containing real addresses in invalid entries of the address translation table, and said third information containing a virtual address for an invalid entry of the address translation table, an access register for translating the virtual address and at least one portion of a page register related to the access register. Hence, the interrupt processing for address translation makes it possible to easily rewrite the address translation table for the address translation.

BRIEF DESCRIPTION OF THE DRAWINGS

FIG. 16 is a table showing the combination of an instruction fetch and an operand fetch spaces according to the prior art; and FIG. 17 is a table showing the combination of an instruction fetch and an operand fetch spaces according to the invention.

DESCRIPTION OF PREFERRED EMBODIMENTS

An embodiment of the invention will be described with reference to the drawings.

Figure 1:
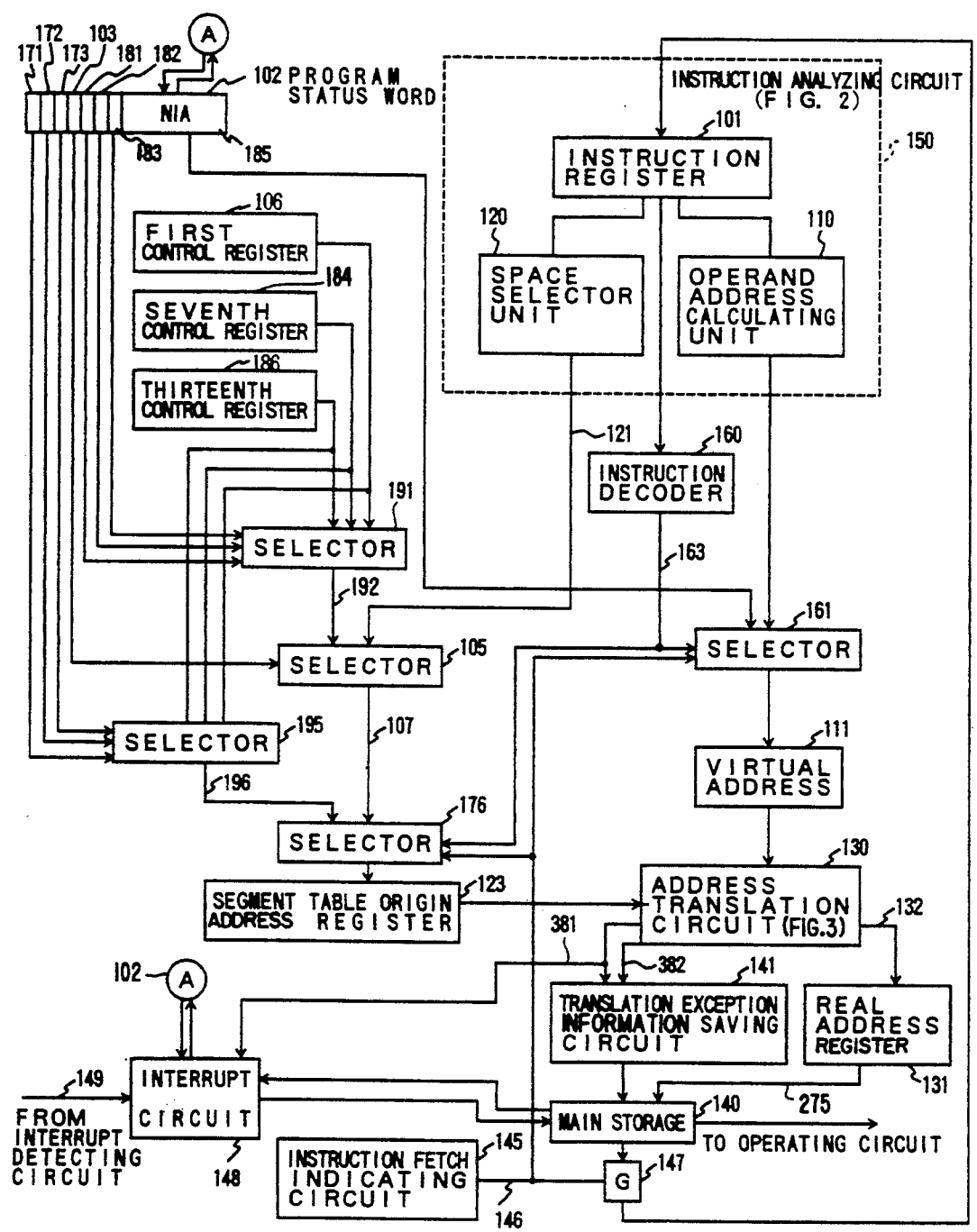
FIG. 1 is a block diagram showing an address translation device according to an embodiment of the invention.

FIG. 1 is a block diagram showing an instruction analysis circuit and an address translation device designed according to an embodiment of the present invention, both of which are used in a computer system employing a virtual storage system.

The main components of the present embodiment include an operand address calculating unit 110, a space selector unit 120, an address translation unit 130, a first control register 106, a seventh control register 184, a thirteenth control register 186, a space-selecting invalid flag 103, and space effective flags 181, 182, 183, said flags being located in a program status word (PSW) 102.

The address translation device shown in FIG. 1 realizes address translations for instruction fetch and operand fetch.

At first, the address translation for an operand fetch will be described. For an operand fetch, the instruction to be executed is loaded in the instruction register 101. The process of loading the instruction in the instruction register 101 will be described together with the description of an instruction fetch. An instruction decoder 160 serves to switch on an operand fetch signal 163 when an instruction is read into the instruction register 101. The operand fetch signal 163 is sent to selectors 161 and 176, thereby triggering the operand address translation. The operand address calculating unit 110 serves to read the content of the instruction register 101 and calculate an operand address (virtual address) of an instruction to be executed, and send the resulting signal to the selector circuit 161. When the operand fetch signal 163 is switched on, the selector circuit 161 selects the output of the operand address calculating unit 110 in a manner to send out a virtual address of an operand to the virtual address register 111. The space selector 120 serves to determine which virtual space an operand is to be read from and obtain the origin address of a segment table in a manner to output it to a signal line 121. The segment table is required for translating the virtual address saved in the virtual address register 111 into a real address. The function of the space selector 120 will be detailed in FIG. 2.

The space selector invalid flag 103 in the program status word register (PSW) 102 determines whether or not the output result of the space selector 120 is used. If the flag 103 is off (effective), the origin address of the segment table is selected and is stored in the segment table origin address register 123. If the flag 103 is on (invalid), the selector 105 does not select the signal line 121. Alternately, the space identifiers selected in the selector circuit 191 by the space effective flags 181, 182, 183 in the program status word 102 selected by the selector circuits 105 and 176 and then are stored in the segment table origin address register 123.

The first control register 106, the seventh control register 184 and the thirteenth control register 186 respectively hold identifiers of a primary space, a secondary space and a home space. These identifiers are sent to a selector circuit 191 in which they are selected by the flags 181, 182, 183 in the program status word 102. The selector circuit 191 serves to select the content of the first control register 106 if the primary space effective flag 181 in the program status word 102 is on, the content of the seventh control register 185 if the secondary space effective flag 182 is on, and the content of the thirteenth control register 186 if the home space effective flag 183 is on. The selector circuit 191 serves to send the selected content to the selector circuit 105 through a signal line 192. If the access register invalid flag 103 is on (invalid), the selector circuit 105 serves to select a signal line 192 and sends it to a selector 176 through a signal line 107. On the other hand, if the access register invalid flag is off (effective), the selector circuit 105 serves to select a signal line 121 and send it to the selector circuit 176 through the signal line 107. On the signal line 121, the space identifier matching to a virtual space specified by the access register is passed. The space identifier is an output of the space selector 120, which is detailed in FIG. 2. The selector circuit 176 selects the signal line 107 if the operand fetch signal 163 is on or the signal line 196 if the instruction fetch signal 146 is on in a manner to store the space identifier in the segment table origin address register 123.

The address translation circuit 130 serves to translate a virtual address pointed by the virtual address register 111 to a real address using an address translation table specified by the segment table origin address register 123 and save the resulting real address in a real address register 131. The content of the main storage 140 specified by the real address 131 is sent to an operating circuit. On the other hand, if the address translation table is invalid and the address translation is not carried out, the address translation circuit 130 serves to switch on an address translation exception signal 381 so that a translation exception information saving circuit 141 is operated to save various kinds of information in a main storage unit. The saving operation will be detailed in FIG. 3.

The address translation exception signal 381 serves to trigger an interrupt circuit 148. The interrupt circuit 148 is triggered by the address translation exception signal 381 or a signal 149 sent from another interrupt-detecting circuit and serves to save the program status word 102 given in case of causing an interrupt in the main storage 140 and load a new program status word for processing an interrupt from the main storage 140 to the program status word 102. The operation will be detailed in FIG. 5.

When fetching an instruction, an instruction fetch indicating circuit 145 outputs an instruction fetch signal 146. An instruction fetch address is indicated by a next instruction address 185 of the program status word 102 and is sent to the selector circuit 161. When the instruction fetch signal 146 is on, the selector circuit 161 selects an address of an instruction indicated by the next instruction address (NIA) 185 and sends it to a virtual address register 111. On the other hand, the contents of the first control register 106, the seventh control register 184 and the thirteenth control register 186 are sent to a selector 195. The selector 195 serves to select the first control register 106 if an instruction space selecting flag 171 in the program status word 102 is on, the seventh control register 184 if a flag 172 is on, and the thirteenth control register if a flag 173 is on and send the selected one to the selector circuit 176 through the signal line 196. When the instruction fetch signal 146 is on, the selector circuit 176 serves to select the signal line 196 in a manner to store the space identifier for instruction fetch in the segment table origin address register 123.

As described above, when an instruction is being fetched, the next instruction address in the program status word 102 is saved in the virtual address register 111. The contents of the control registers 106, 184, 186 selected by the flags 171, 172, 173 are saved in the segment table origin address register 123. With these pieces of information, the address translation circuit 130 performs address translation and outputs the result to the real address register 131. The content of the main storage specified by the real address 131 is output to a signal line 275. If the instruction fetch signal 146 is on, a gate 147 is opened so that the main storage content 275 is stored in the instruction register 101.

As is understood from the above description, the present embodiment is designed to forcibly nullify the output result of the space selector 120. Even if a program is executed with the space selector 120 immediately before an interrupt occurs, the OS for processing the interrupt can remain operating without having to save or to recover the content of various registers used in the space selector. Further, the embodiment is designed to independently specify virtual spaces for instruction fetch and for operand fetch. Hence, it offers high programming freedom so that the interrupt processing can be upgraded. The interrupt processing done with the address translation device designed according to the invention will be detailed in FIG. 4.

In order to demonstrate how effective the invention is, FIGS. 16 and 17 show the combinations of virtual spaces to be specified when the instruction is fetched and when the operand is fetched. FIG. 16 is a table showing the combinations of spaces for an instruction and an operand according to the prior art. As shown, the combinations of instructions and operand spaces are fixed at just four. FIG. 17 is a table showing the combinations of instructions and operand spaces according to the invention. All kinds of the combinations are made possible.

Figure 2:
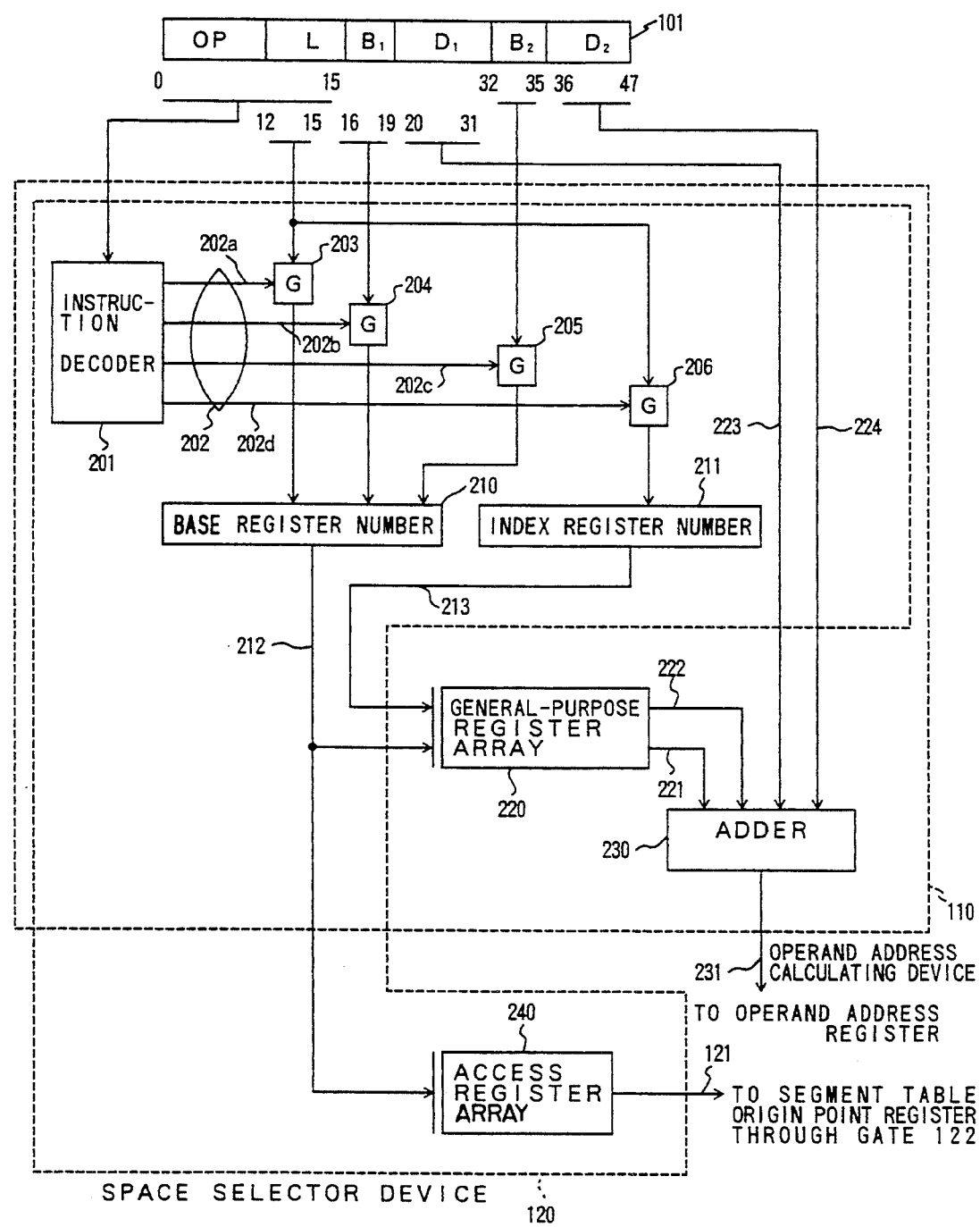
FIG. 2 is a block diagram showing an operand address calculating device including a space selector device according to the embodiment of the invention.

FIG. 2 shows the details of the operand address calculating unit 110 and the space selector 120.

In general, an operand address can be obtained by adding the content of a base register, the content of an index register and a displacement portion. However, how to specify them depends on each kind of instruction. In the architecture used in the IBM 370 series, the position of a base register specified by an instruction operand depends on an instruction code. For the RX type instruction, the base registers are specified by four bits, that is, the bit positions 16 to 19 of the instruction. For the SS type instruction, they are specified by the bit positions 16 to 19 and 32 to 35. An instruction decoder 201 reads an instruction code specified by the bits 0 to 15 of the instruction register and outputs the position of the operand base register of the instruction as a base register position mask signal line 202. That is, when the instruction bits 12 to 15 (R2, R3, X2) are used as base registers, a signal line 202a is on. When the instruction bits 16 to 19 (B1, B2) are used as the base registers, a signal line 202b is on. For the RX type instruction, the bits 12 to 15 are used as registers. Hence, a signal line 202d is set on. These base register position mask signal lines 202a, 202b, 202c, 202d respectively actuate gates 203, 204, 205, 206 so that any one of these gates extracts the corresponding portion of the instruction register 101. The extracted portion is saved in a base register number register 210 and an index number register 211.

The base register number and the index register number are sent to a general-purpose register array 220 through the signal lines 212 and 213, respectively. The general-purpose register array 220 outputs the corresponding register contents on signal lines 221 and 222. The content of the base register, the content of the index register, the displacement portion of the instruction, and the displacement portion of the SS type second operand are respectively sent to an adder 230 in which they are added. The adder 230 supplies an output on the signal line 231 to virtual address register 111 shown in FIG. 1 in which the output is stored as a virtual address of an operand.

On the other hand, the base register number saved in the register 210 is used for selecting a space. The base register number is sent to an access register array 240 through the signal line 212 in order to select the access register having the corresponding number. The access register serves to define a space and contains an address-translation segment table address for the space saved therein. The segment table origin point address is sent to the segment table origin address register shown in FIG. 1 on the signal line 121 and to the address translation circuit 130 on the signal line 125.

Figure 3:
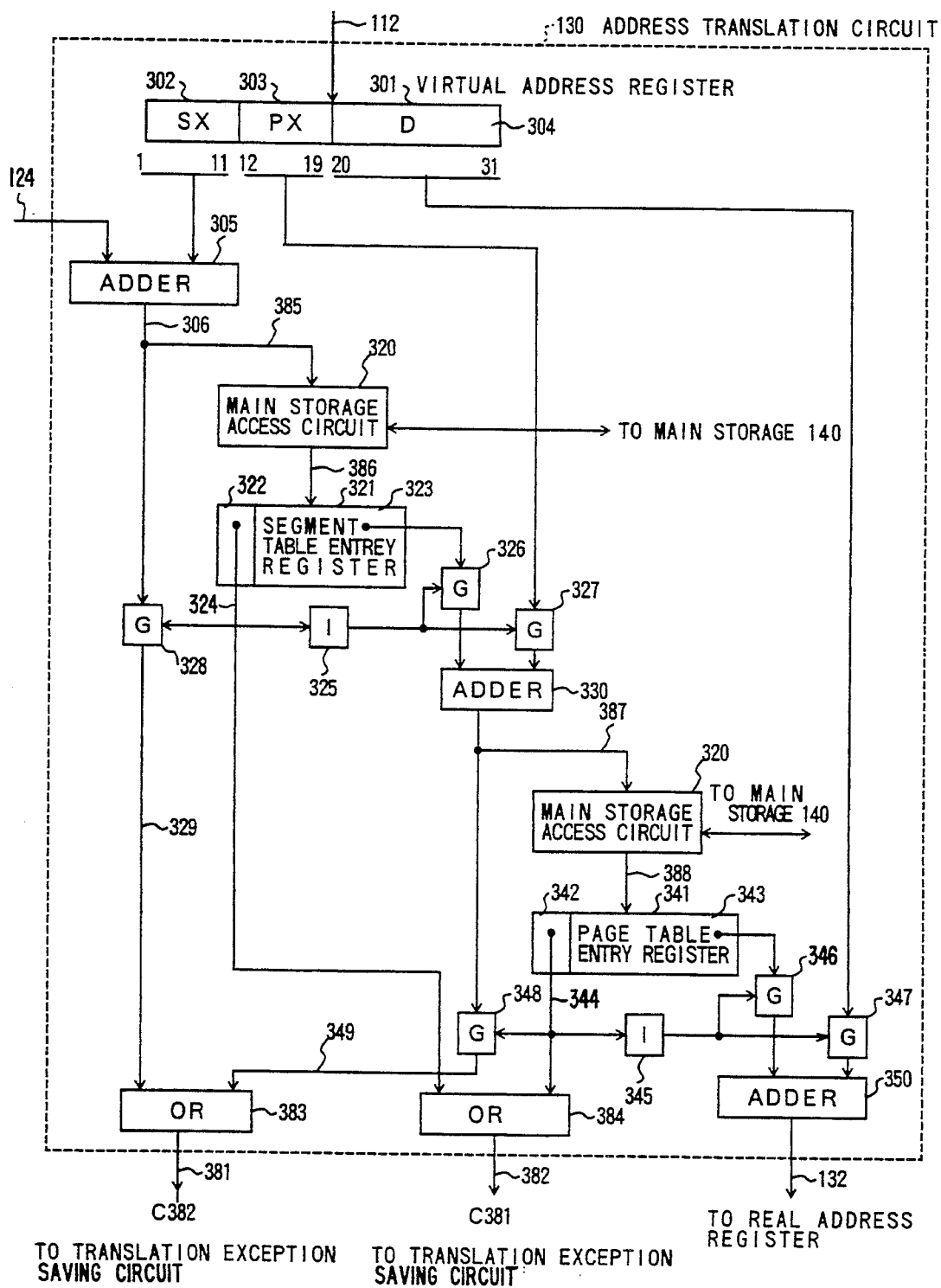
FIG. 3 is a block diagram showing an address translation circuit according to the embodiment of the invention.

FIG. 3 is a block diagram showing the details of the address translation circuit 130. The virtual address transmitted on the signal line 112 is stored in the virtual address register 301. The virtual address is translated into a real address based on a segment table specified by a signal line 124. The real address is output to a signal line 132. If the content of the segment table 321 or the page table 341 is invalid and the address translation is not completed, an address translation exception signal is sent to a translation exception information storing unit through a signal line 382.

Then, a segment index portion (SX) 302 specified by the bits 1 to 11 of the virtual address register 301 and a segment table origin point address passed on the signal line 124 are added in the adder 305 for obtaining an address of a segment table entry. The segment table entry address is sent to a main storage access circuit 320 through a signal line 385. The corresponding content of the main storage is stored in a segment table entry register 321 through a signal line 386. The main storage access circuit 320 is not described, because it can be realized by a well-known technique. The segment table entry register 321 consists of a segment table invalid flag 322 and a page table origin point address 323. If the invalid flag 322 is off (effective), a gate 326 and a gate 327 are opened through a signal line 324 and an inverter 325, thereby continuing the address translation. In this case, the adder 330 adds the content of the page table origin point address 323 to a page index portion (PX) 303 of the virtual address register 301 for obtaining a page table entry address. The page table entry address is sent to the main storage access circuit 320 through a signal line 387 so that the corresponding content of the main storage is stored in a page table entry register 341 through a signal line 388. The page table entry register 341 consists of a page table invalid flag 342 and a real address 343. If the invalid flag 342 is off (effective), a gate 346 and a gate 347 are opened through a signal line 344 and an inverter 345, thereby continuing the address translation. In this case, the adder 350 adds the content of the real address to a displacement portion (D) 304 of the virtual address register 301 and outputs the adding result as a real address given as a result of the address translation to a signal line 132. On the other hand, if the segment table entry invalid flag 322 is on (invalid), a gate 328 is opened so that the segment table entry address which is an output of the adder 305 is sent to an OR circuit 383 through a signal line 329. The output of the OR circuit 383 is an address of an address translation table in which an address translation exception is caused and is sent to the translation exception information storing unit 141 through a signal line 381.

Furthermore, the segment table entry invalid flag 322 and the page table entry invalid flag 342 are ORed in the OR circuit 384 and the resulting signal is sent to the translation exception information storing unit 141 through a signal line 382.

Figure 4:
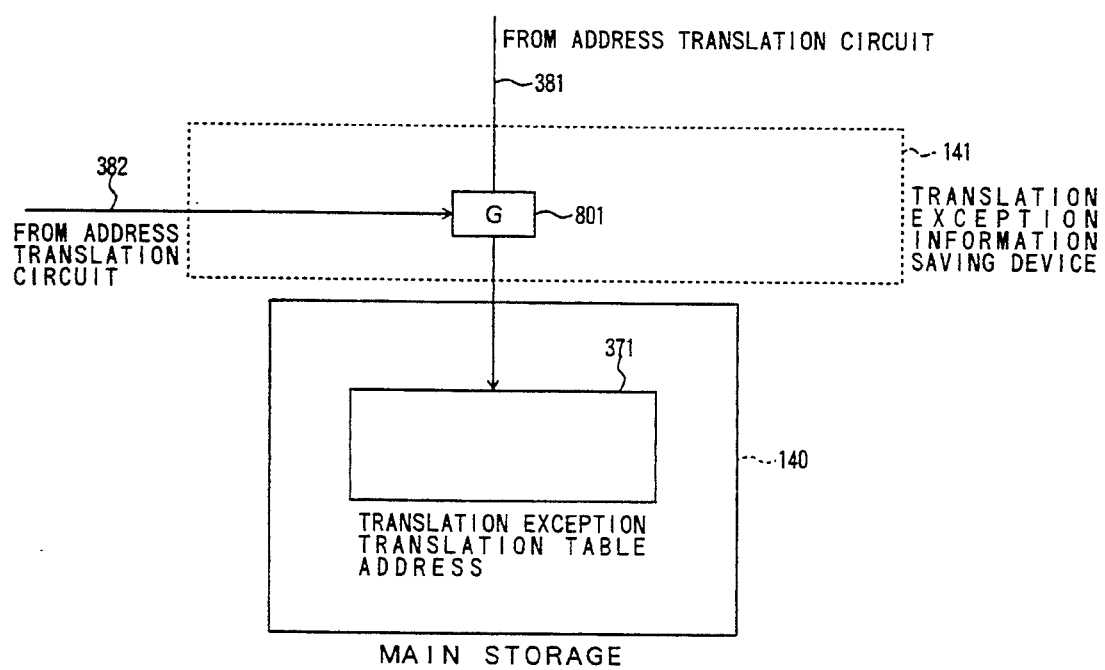
FIG. 4 is a block diagram showing a main storage saving circuit.

FIG. 4 shows the detailed arrangement of a translation exception information storing circuit 141. If an address translation exception signal, sent from the address translation circuit 130 through the signal line 382, is on (meaning that an address translation exception occurs), a gate 801 is actuated so that an address translation table address of an address translation exception is stored in a translation exception translation table address 371 which is located on a specific area of the main storage 140.

Figure 5:
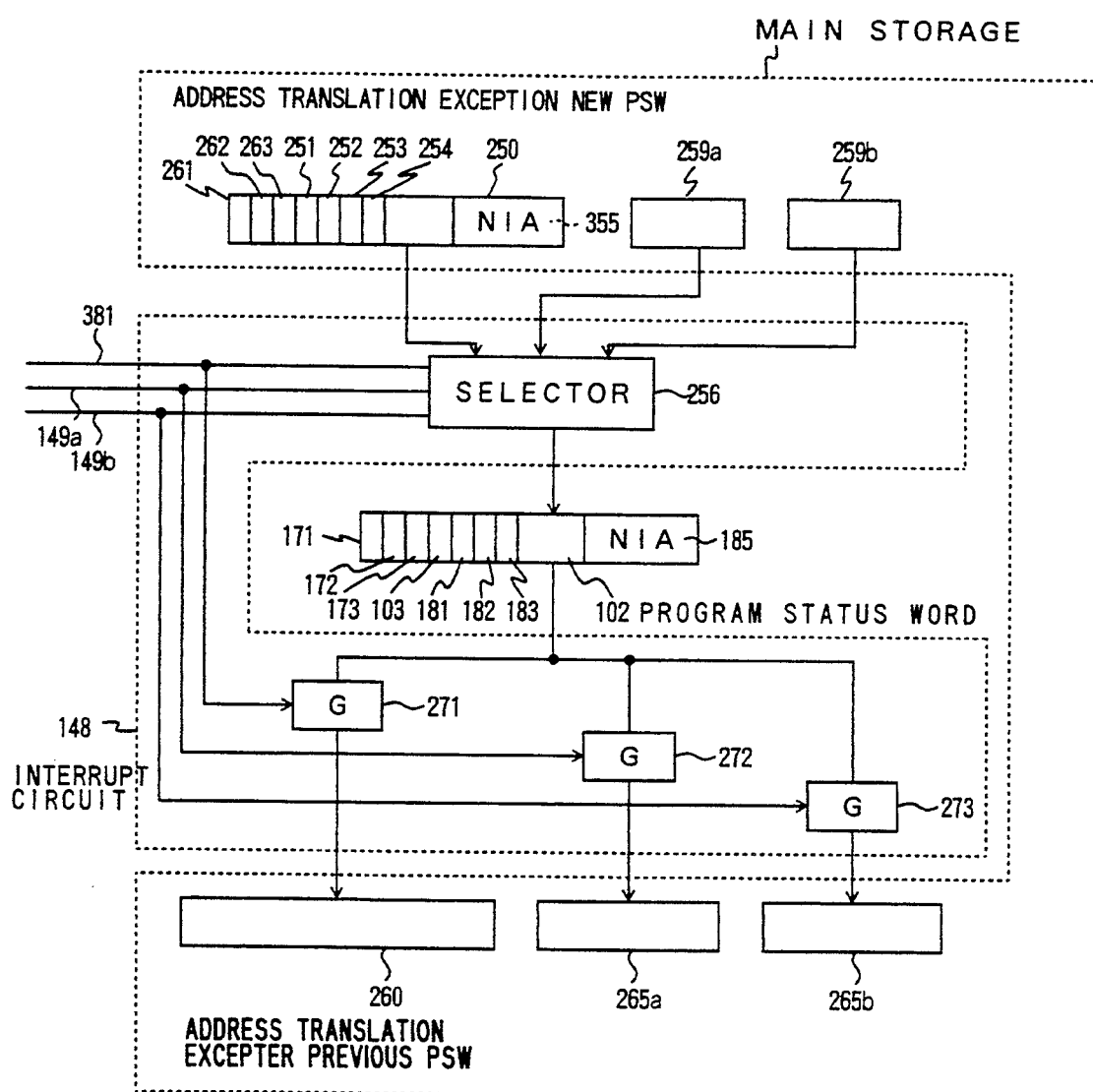
FIG. 5 is a block diagram schematically showing a prior art interrupt device.

FIG. 5 shows the arrangement of an interrupt circuit. Herein, the interrupt circuit is briefly described, since it is made public. The interrupt circuit operates in response to an interrupt signal. The interrupt signal is, for example, an address translation exception signal line 381 led from the address translation circuit 130 or interrupt signals 149a, 149b sent from the other interrupt detecting circuits. The kinds of interrupts depend on each computer. Herein, assume that there exists a total of three interrupts of an address translation exception and the other two interrupts. Further, the description will be expanded on the address translation exception. Yet, the invention is not limited by the number of interrupt kinds.

Further still, the interrupt processing takes the steps of saving the program status word (PSW) 102 in the corresponding area located in the main storage and loading the program status word for interrupt processing from the main storage 102 according to the kind of interrupt. At first, an address translation exception signal 381 which is an interrupt signal, an interrupt signal 149a, and an interrupt signal 149b respectively function as opening gates 271, 272 and 273. As such, each program status word is saved in an address translation previous PSW 260, an interrupt previous PSW 265a, and an interrupt previous PSW 265b. A selector circuit 256 serves to select an address translation exception new PSW 250, an interrupt new PSW 259a and an interrupt new PSW 259b and save each in the program status word 102. The selector circuit 256 selects the address translation exception new PSW 250 if the address translation exception signal 381 is on, the interrupt new PSW 259a if the interrupt signal 149a is on, or the interrupt new PSW 259b if the interrupt signal 149b is on. The program status word 102, as described with respect to FIG. 1, mainly consists of various kinds of flags 171, 172, 173, 103, 181, 182, 183 for specifying the selection of a space and a next instruction address (NIA) 185 for indicating an instruction address to be executed. The interrupt new PSW has the corresponding components. For example, the address translation exception new PSW 250 consists of flags 261, 262, 263, 251, 252, 253 and an instruction address 355 corresponding therewith. How to use them will be described with reference to FIG. 6.

Figure 6:
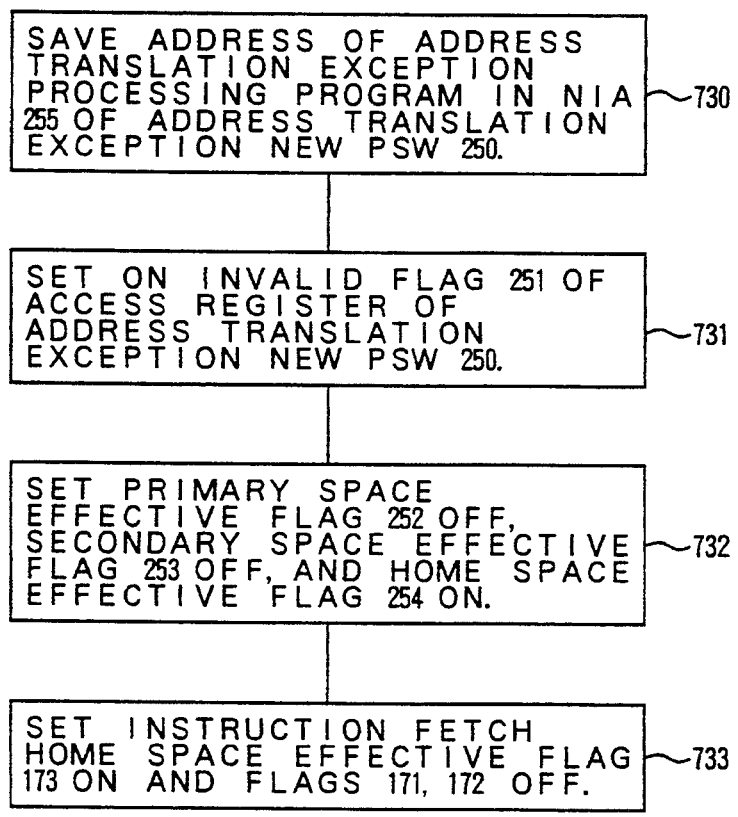
FIG. 6 is a flowchart showing a new PSW initializing for interrupt.
Figure 7:
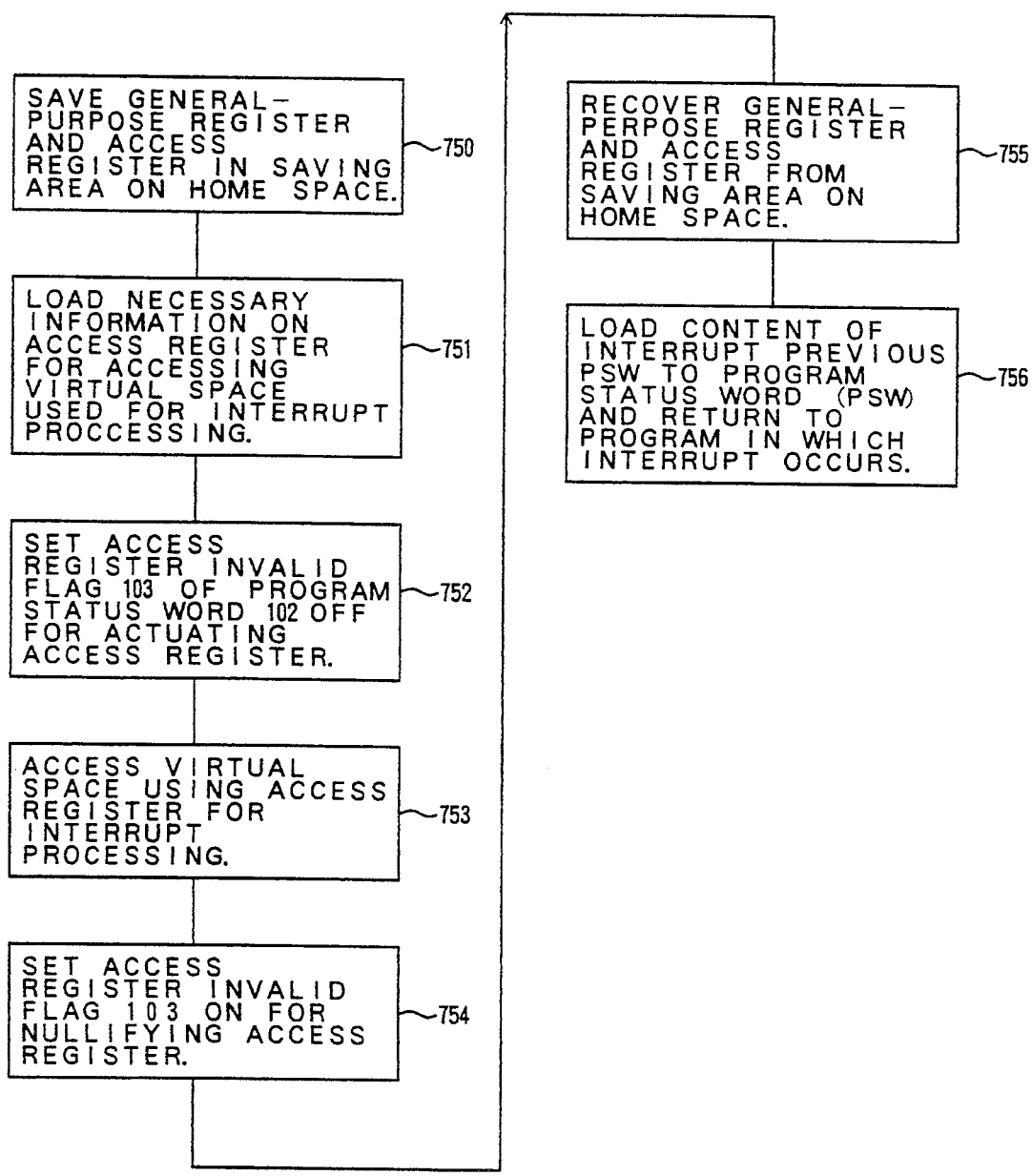
FIG. 7 is a flowchart showing an interrupt-processing done when the address translation device of the invention is used.

FIGS. 6 and 7 are flowcharts illustrating the interrupting routines when using an address translation device of the invention as shown in FIGS. 1 to 5.

FIG. 6 is a flowchart illustrating the new PSW initializing for an address translation exception interrupt in case of using an address translation device of the invention. This processing is executed when a system is initialized. It takes the steps of storing an address of an address translation exception processing program in the NIA 255 of the address translation exception new PSW 250 (step 730), switching the access register invalid flag 251 in the address translation exception new PSW 250 on (invalid) (step 731), switching the primary space effective flag 252 and the secondary space effective flag 253 in the address translation exception new PSW 250 off and switching the home space effective flag 254 on (step 732). Further, it takes the step of switching an instruction fetch home space effective flag 173 on and switching an instruction fetch primary space effective flag 171 and an instruction fetch secondary space effective flag 172 off for changing an instruction fetch space into a home space (step 733). The foregoing steps result in nullifying the access register when an address translation exception occurs and finishing the preparation for passing control to the address translation exception processing program.

FIG. 7 is a flowchart illustrating the interrupt routine when the interrupt processing occurs when using the address translation exception device of the invention.

The interrupt routine takes the steps of saving general-purpose registers and access registers in the saving area on the home space (step 750), loading to the access register the information required for accessing to a virtual space used in the interrupt processing (step 751), switching off the access register invalid flag 103 in the program status word 102 for effecting the access registers (step 752), accessing to virtual spaces using the access registers for executing the interrupt processing (step 753), switching on the access register invalid flag 103 for nullifying the access registers (step 754), recovering general-purpose registers and access registers from a saving area on the home space (step 755), and loading the content of an interrupt previous PSW to the program status word (PSW) 102 and returning to the program in which the interrupt has occurred (step 756).

Figure 8:
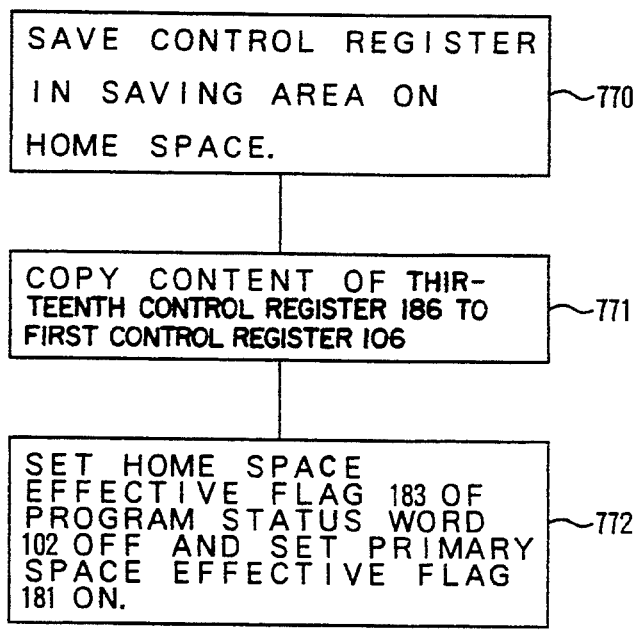
FIGS. 8 and 9 are flowcharts showing an interrupt-processing according to the prior art.
Figure 9:
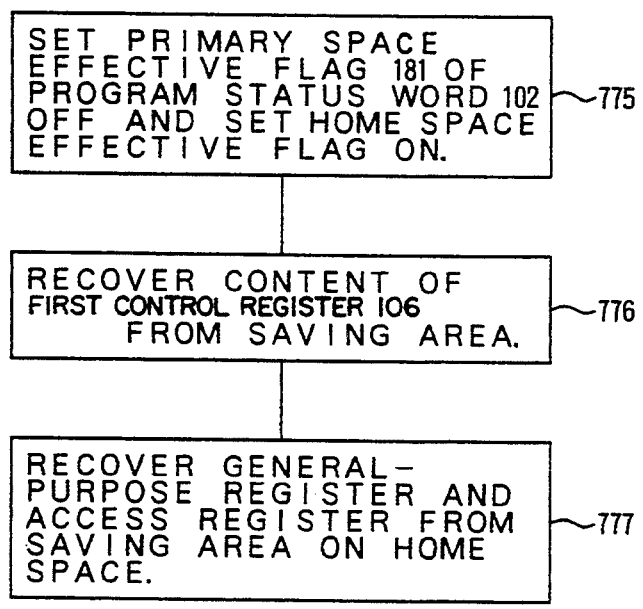

FIGS. 8 and 9 are flowcharts illustrating the initializing and the finishing processing for the interrupt processing designed by the inventor, assuming that the conventional address translation device is used.

FIG. 8 illustrates the processing which is equivalent to the step 751 shown in FIG. 7. The processing takes the first step of saving the content of control registers in a saving area located on the home space (step 770). Then, it prepares for changing the home space mode to the primary space mode since the access registers cannot be used in the home space mode. For the preparation, it takes the second step of copying the content of Thirteenth Control Register 186 into First Control Register 106 in a manner to equalize the spaces to be accessed in the primary space mode to those in the home space mode (step 771). Then, it takes a further step of setting off a home space effective flag 183 in the program status word (PSW) 102 and setting on the primary space effective flag for implementing the change of the home space mode to the primary home mode.

FIG. 9 illustrates the processing which is equivalent to the step 755 shown in FIG. 7. It takes the steps of setting off the primary space effective flag 181 in the program status word 102 and setting on the home space effective flag 183 (step 775), recovering the content of the first control register 106 from the saving area located on the home space (step 776), and finally recovering the contents of the general-purpose registers and the access registers from the saving area located on the home space.

As has been apparent from FIGS. 8 and 9, more saving areas and overhead are required in the interrupt processing when the address translation device of the invention is not used.

Figure 10:
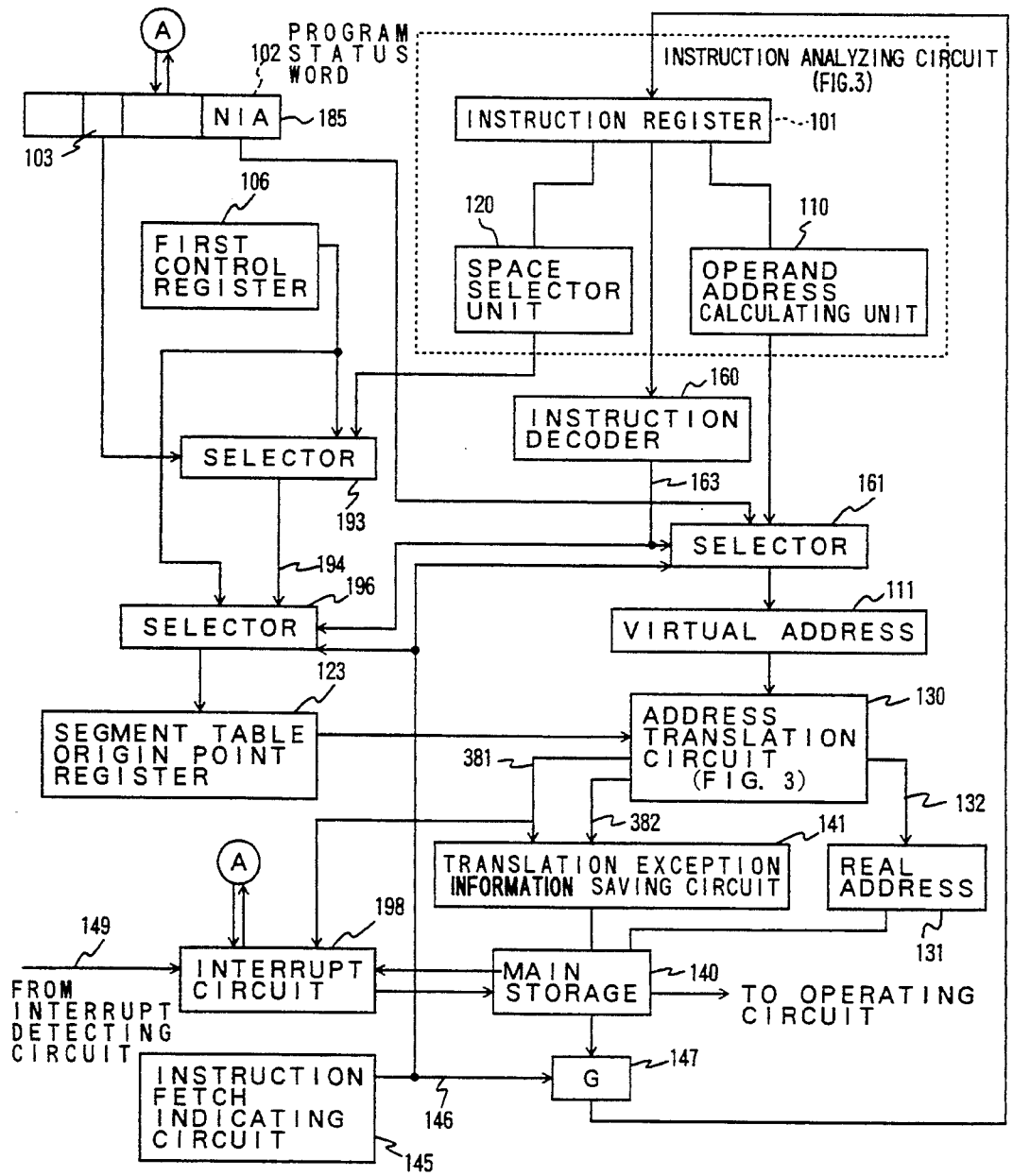
FIG. 10 is a block diagram showing an address translation device according to another embodiment of the invention.

FIG. 10 is a block diagram showing an instruction analysis circuit and an address translation device designed according to an embodiment of the invention, both of which are used in a computer system employing a virtual storage method.

The different aspect of this embodiment from the embodiment shown in FIG. 1 is that only one control register, that is, the first control register 106, is provided in place of a plurality of control registers and the flag 103 in the program status word 102 is used for controlling whether or not the first control register is effective. The other arrangement is similar to that shown in FIG. 1. Hence, the description will be directed to the different aspect.

The space-selecting invalid flag 103 serves to determine whether or not the output result of the space selector 120 is used. If the flag 103 is off (effective), a segment table origin address which is an output of the space selector 120 is selected through the inverter 104 and the gate 122 and is sent to the selector circuit 196 through the signal line 194. If the access register effective flag 103 is on (invalid), the selector circuit 193 selects the first control register 106 and sends it to the selector circuit 196 through the signal line 194. The selector circuit 196 selects the first control register 106 if the instruction fetch signal 146 is on or the signal line 123 if the operand fetch signal 163 is on in a manner to save it in the segment table origin address register 123.

Figure 11:
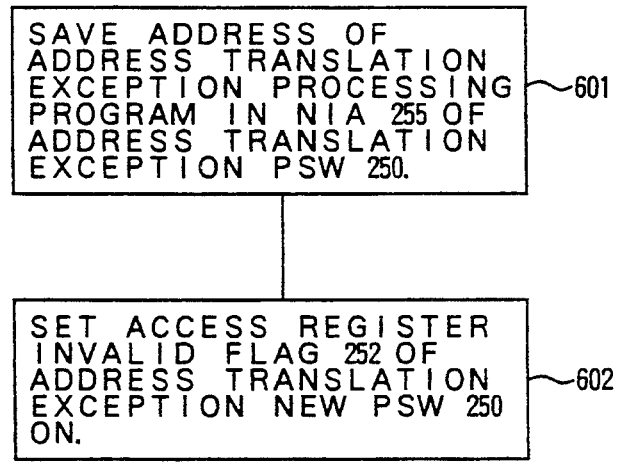
FIG. 11 is a flowchart showing a new PSW initializing for an address translation exception when the address translation device of the invention is used.
Figure 12:
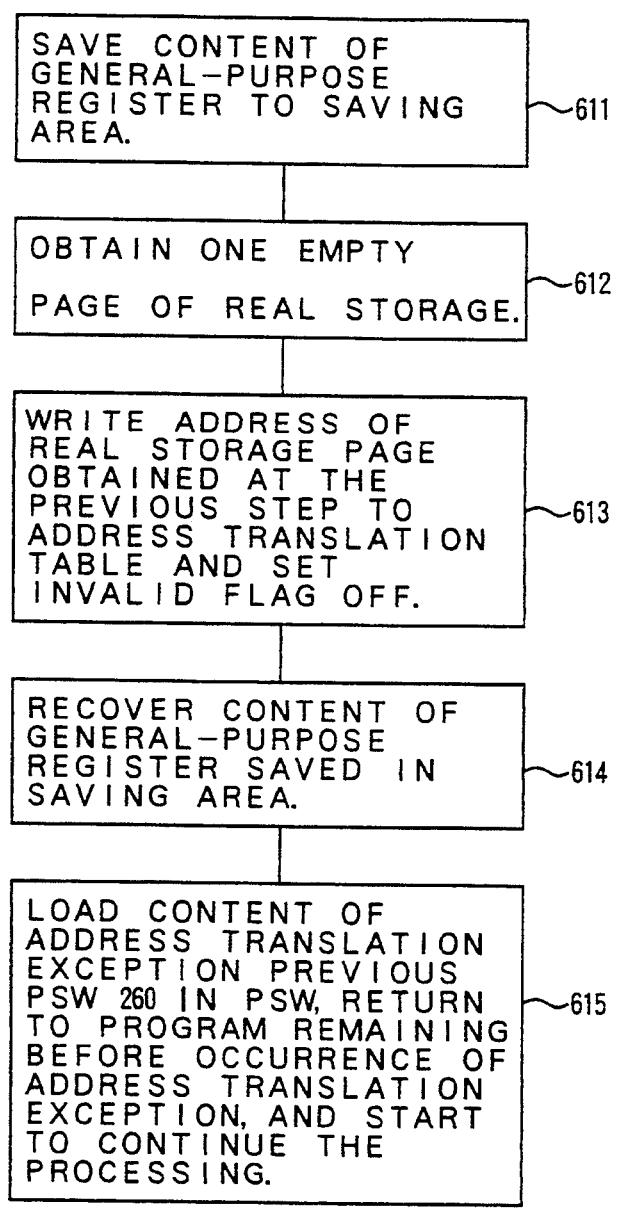
FIG. 12 is a flowchart showing an interrupt-processing done when the address translation device of the invention is used.

FIGS. 11 and 12 are flowcharts illustrating the interrupt routines realized in case of using the address translation device shown in FIG. 10 according to the invention.

FIG. 11 is a flowchart illustrating the address translation exception new PSW initializing. This processing is executed when a system is initialized. It takes the steps of saving an address of an address translation exception processing program in an NIA 255 in the address translation exception new PSW 250 (step 601) and setting an access register invalid flag 251 in the address translation exception new PSW on (invalid) (step 602). The foregoing steps result in nullifying the access registers when an address translation exception occurs and finishing the preparation for passing the control to the address translation exception processing program.

FIG. 12 is a flowchart illustrating an embodiment of an address translation exception processing when an address translation exception (page fault) occurs. The processing shown in FIG. 11 finally passes the control to the present processing in the state that the access registers are invalid. After saving the content of general-purpose registers in a saving area (step 611), the present processing transfers to page fault processing. The page fault processing takes the steps of obtaining an empty page in the real storage (step 612), and saving the address of the obtained real storage page in a page table entry pointed by a translation exception table address 374 and setting the invalid flag off (effective) (step 613). The foregoing processing brings about an address-translatable state.

For returning to a program in which page fault occurs, it takes the further steps of loading and recovering the content of general-purpose registers saved in a saving area and loading the content of an address translation exception previous PSW on a program status word (PSW) 102 (step 615). These steps make it possible to actuate an access register effective flag for the program interrupt previous PSW and recovering the state caused immediately before the address translation exception occurs (in which case the foregoing processing results in solving the address translation exception), thereby enabling continuous operation of a program in which the address translation exception occurs.

Figure 13:
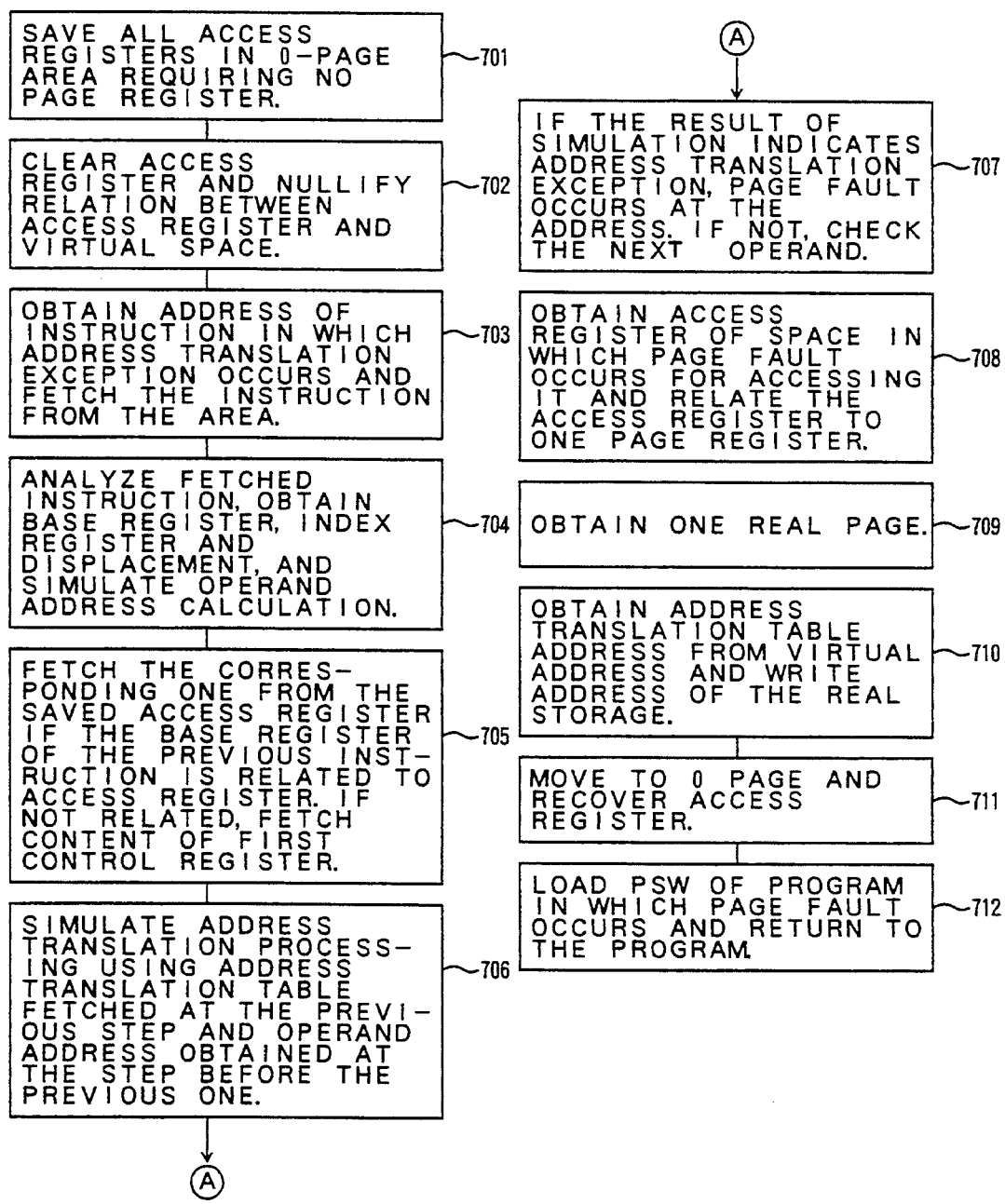
FIG. 13 is a flowchart showing the processing of the address translation exception designed on the prior art.

In order to exhibit the advantage of the invention over the prior art as has been understood from FIG. 10, FIG. 13 is a flowchart illustrating the page fault processing done on the conventional processing technique when a page fault is generated in the address translation for extracting a reference space from an execution space with an access register related with the base register. When using the conventional address translation device, the address translation exception processing performed when using the access register will be described as follows.

At first, before starting the page fault processing, the access registers are nullified. The process is indispensable for nullifying access registers used by a program in which a page fault occurs and for preventing the undue use of the access registers when the OS is processing the page fault. Yet, the page register cannot be used because it is impossible to understand the relationship between the base registers and the access registers. Hence, the processing is done using only the 0 page of the main storage because the 0 page does not require the base register.

The processing takes the steps of saving all the content of the access registers 240 (step 701) and clearing the content of the access registers 240 and nullifying the relation between the base registers and the access registers (step 702). These steps result in allowing the OS to freely use the base register.

In order to solve a page fault, it is necessary to obtain a space in which the page fault occurs and the virtual address thereof. The virtual address can be saved in the main storage. The space has to be obtained with simulation. The simulation takes the steps of picking up an address of an instruction in which the page fault occurs from the main storage and picking up the instruction located on the address (step 703), analyzing the instruction and picking up the base register, the index register and the displacement from the instruction for calculating an address of an operand (step 704), and simulating the address translation with respect to the operand address. If the base register is related to an access register, the simulation uses an address translation table pointed by the access register. If it is not related thereto, the simulation uses an address translation table pointed by the first control register (steps 705, 706).

If the simulated address translation indicates an address translation exception, it means that a page fault occurs in the operand address. If it indicates the normal address translation, the address translation of the operand is simulated (step 707). For accessing the space in which a page fault occurs and solving the page fault, the processing takes the further steps of relating the address register obtained at the step 405 to any base register (step 708), obtaining one real storage page (step 709), and writing an address of the real storage page to the address translation table (step 710).

For final processing, it takes the steps of transferring to the 0 page, recovering the access registers (step 711), and loading the PSW of the program in which a page fault occurs and returns to the original program (step 712).

As is apparent from the comparison between FIGS. 12 and 13, the present invention is capable of suppressing the saving recovery processing of the register to a minimum even when an interrupt such as an address translation exception occurs. And, it is also capable of obtaining an address of the address translation table causing an address translation exception, which is a key point of the address translation exception processing, without any overhead. It results in making the processing faster.

Figure 14:
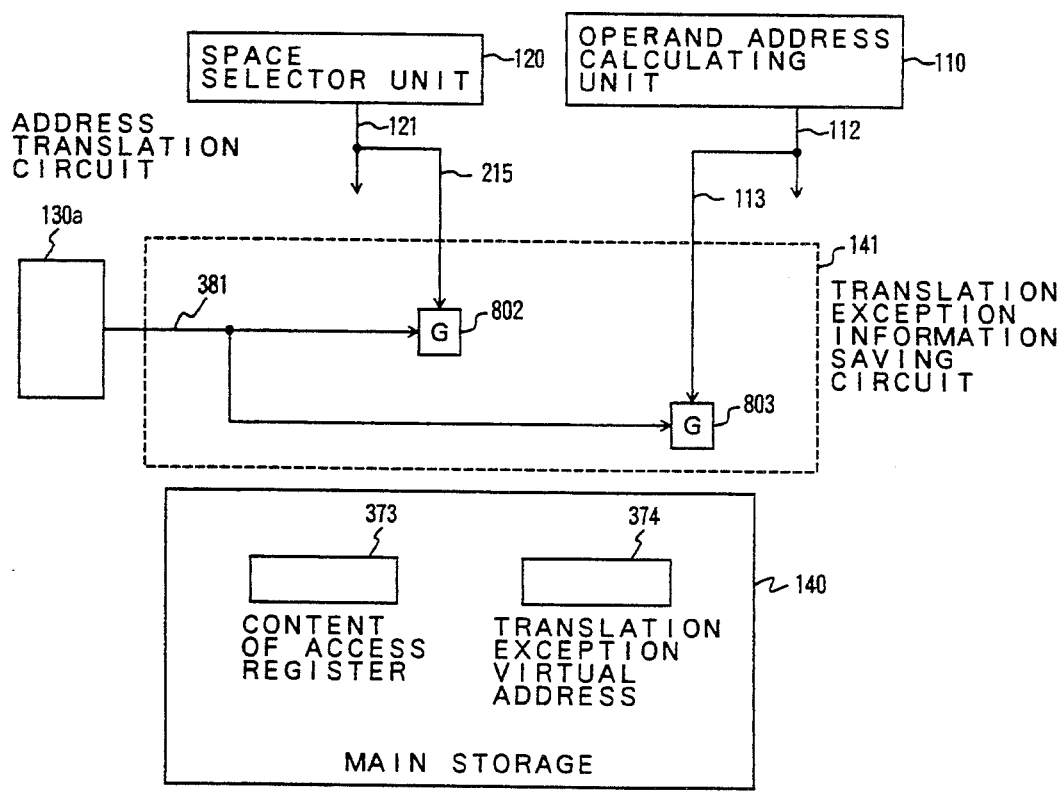
FIG. 14 is a block diagram showing a main storage saving circuit according to another embodiment of the invention.

FIG. 14 shows another arrangement of the translation exception information saving circuit 141. An address translation circuit 130a is equal to the address translation circuit 130 shown in FIG. 3 from which the signal line 382 and the signal line generating circuit are removed. If the address exception signal sent from the address translation circuit 130a through a signal line 381 is on (generation of the address translation exception), the address translation circuit 130a actuates a gate 802, thereby opening a gate 803. The content of an access register sent from a space selector unit 120 through a signal line 215 is saved in an access register content area 373, which is a specific area of the main storage 140. Then, the virtual address sent from an operand address calculating unit 110 through a signal line 113 is saved in a translation exception virtual address area 374.

Figure 15:
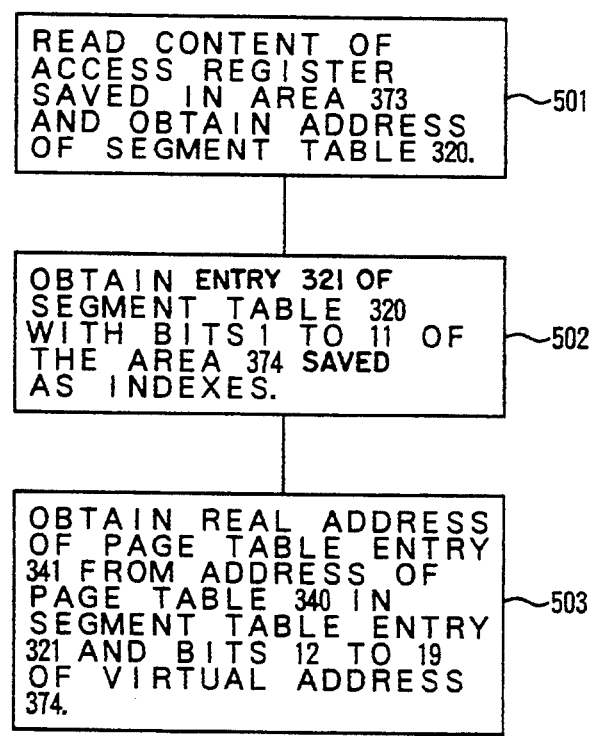
FIG. 15 is a flowchart showing the processing equivalent to the step 703 shown in FIG. 13.

FIG. 15 is a flowchart illustrating the equivalent process to the step 613 shown in FIG. 12.

The flowchart shown in FIG. 15 describes how to obtain a real address of an entry 341 of a page table 340 using the content of the access register and the translation exception virtual address saved in the areas 373 and 374. The flow takes the steps of reading the content of an access register saved in the area 373 for obtaining an address of the segment table 320 (step 501), obtaining an entry 321 of a segment table 320 with the bits 1 to 11 of the address translation exception virtual address saved in the area 374 as indexes (step 502), and obtaining a real address of an entry 341 of a page table 340 from the address of the page table 340 in the segment table entry 321 and the bits 12 to 19 of the translation exception virtual address 374 (step 503).

As is apparent from the above description, obtaining a real address of a page table for saving it in the page table entry at the step 163 has been described as a method of directly obtaining a real address of a page table entry from the translation exception table address 374. Yet, the foregoing processing may take various kinds of methods.

As is apparent from the comparisons between FIG. 7 and FIGS. 8 and 9 and between FIG. 12 and FIG. 13, the control overhead can be reduced in light of the following respects of the method for managing the virtual space related to the address register.

(1) The interrupt processing is made possible whether or not the interrupted program accesses a virtual space using an access register.

(2) When an address translation exception occurs, it is possible to obtain the corresponding virtual space and the address translation table address corresponding thereto without having to simulate the instruction. Hence, the overhead concerning the address translation processing can be greatly reduced.

What is claimed is:

1. An address translation device for translating a virtual address belonging to one of a plurality of virtual spaces into a corresponding real address, said address translation device comprising:

first means for holding a plurality of virtual space identifiers respectively indicating corresponding ones of the virtual spaces;

second means for holding first selecting information specifying a virtual space identifier, from among the virtual space identifiers held by said first means, for a virtual space to which a virtual address for an instruction belongs, and for holding second selecting information specifying a virtual space identifier, from among the virtual space identifiers held by said first means, for a virtual space to which a virtual address for an operand belongs;

third means, connected to said first and second means, for outputting information indicating that the virtual address to be translated corresponds to either of the instruction and the operand;

fourth means, connected to said third means, for selecting one of the virtual space identifiers, from among the virtual space identifiers held by said first means, based on either of the first selecting information and the second selecting information according to the information output by said third means; and fifth means, connected to said fourth means, for translating the virtual address, corresponding to the selected virtual space identifier, into a corresponding real address.

2. The address translation device as claimed in claim 1, wherein said first and second selecting informations are held as a part of a program status word.

3. The address translation device as claimed in claim 2, wherein said first means comprises a plurality of control registers and a plurality of access registers, each of which is provided correspondingly to a base register number specified by an instruction, and wherein said fourth means selects a virtual space identifier held in any one of said control registers and said access registers which correspond to the base register number specified by the instruction.

4. The address translation device as claimed in claim 1, wherein said first means comprises a plurality of control registers and a plurality of access registers, each of which is provided correspondingly to a base register number specified by an instruction, and wherein said fourth means selects a virtual space identifier held in any one of said control registers and said access registers which correspond to the base register number specified by the instruction.

5. The address translation device as claimed in claim 4, wherein said second selecting information includes suppression information for suppressing the selection, by said fourth means, of one of the virtual space identifiers held in said control registers, and wherein said fourth means selects a virtual space identifier held in an access register corresponding to the base register number specified by an instruction when the information output by said third means indicates that a virtual address to be address-translated is for an operand and said suppression information is de-activated.

6. The address translation device as claimed in claim 5, wherein said suppression information is activated prior to an address translation exception processing which is executed when an address translation by said fifth means has been executed when the specified entry of one of the virtual space identifiers by said fourth means is not found in said first means.

7. The address translation device as claimed in claim 4, wherein said fifth means comprises a plurality of address translation tables, each table corresponding to one of said plurality of virtual spaces and when said fifth means executes the address translation by using an address translation table designated by the virtual space identifier selected by the fourth means and detects that the address translation table designated by the virtual space identifier is invalid, said fifth means outputs translation exception information.

8. The address translation device as claimed in claim 7, further comprising sixth means for storing, into a main memory, at least one of information regarding an access register specified by an instruction, information containing a real address held in an entry of the address translation table which is detected as being invalid and information containing a virtual address which is present when the invalidity of an address translation table is detected.

9. An address translation device for translating a virtual address, belonging to one of a plurality of virtual spaces into a corresponding real address, said address translation device comprising:

first means for holding at least one virtual space identifier for an instruction and at least one virtual space identifier for an operand, each of the identifiers indicating a corresponding virtual space;

second means connected to said first means for selecting either of said held virtual space identifier for an instruction and said held virtual space identifier for an operand, based upon whether the virtual address to be translated corresponds to either one of the instruction and the operand; and third means connected to said second means for translating the virtual address into the corresponding real address, depending upon the virtual space identifier selected by said second means.

10. The address translation device as claimed in claim 9, wherein said first means comprises means for holding a plurality of virtual space identifiers for an instruction and a plurality of virtual space identifiers for an operand, and said second means comprises means for selecting one virtual space identifier from either of said plurality of virtual space identifiers for the instruction and said plurality of virtual space identifiers for the operand, based upon whether the virtual address to be translated correspond to either one of the instruction and the operand.

11. The address translation device as claimed in claim 10, wherein said second means further comprises means for selecting one of either said virtual space identifiers for an instruction and said virtual space identifiers for an operand, said virtual space identifiers being respectively specified by either of a first and a second flag in a program status word.

* * * * *